US011827034B2

United States Patent
Kusada et al.

(10) Patent No.: US 11,827,034 B2
(45) Date of Patent: Nov. 28, 2023

(54) INK JET RECORDING METHOD AND INK JET RECORDING APPARATUS

(71) Applicant: CANON KABUSHIKI KAISHA, Tokyo (JP)

(72) Inventors: Mutsuki Kusada, Chiba (JP); Masayuki Ikegami, Kanagawa (JP); Hiroshi Kakikawa, Kanagawa (JP); Kazuya Nushiro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 17/541,327

(22) Filed: Dec. 3, 2021

(65) Prior Publication Data

US 2022/0184970 A1 Jun. 16, 2022

(30) Foreign Application Priority Data

Dec. 10, 2020 (JP) ................................. 2020-205179
Oct. 28, 2021 (JP) ................................. 2021-176578

(51) Int. Cl.
*B41J 2/175* (2006.01)
*B41J 2/165* (2006.01)
(Continued)

(52) U.S. Cl.
CPC ............... *B41J 2/2107* (2013.01); *B41J 2/14* (2013.01); *B41J 2/16523* (2013.01); *B41J 2/16532* (2013.01); *B41J 2/175* (2013.01); *B41J 2/1753* (2013.01); *B41J 2/17509* (2013.01); *B41J 2/17513* (2013.01); *B41J 2/17553* (2013.01);
(Continued)

(58) Field of Classification Search
CPC ........ B41J 2/2107; B41J 2/14; B41J 2/16523; B41J 2/16532; B41J 2/175; B41J 2/17509; B41J 2/17513; B41J 2/1753; B41J 2/17553; B41J 2/2103; B41J 2/01; C09D 11/30;
(Continued)

(56) References Cited

U.S. PATENT DOCUMENTS 7,004,579 B2 2/2006 Sato et al.
7,056,972 B2 6/2006 Nakazawa et al.
(Continued)

FOREIGN PATENT DOCUMENTS

JP 2003-080724 A 3/2003
JP 2005-171070 A 6/2005
(Continued)

*Primary Examiner* — Yaovi M Ameh
(74) *Attorney, Agent, or Firm* — Venable LLP

(57) ABSTRACT

Provided is an ink jet recording method by which even when an ink jet recording apparatus having a small size and high durability is used, excellent sticking recoverability is obtained and a high-quality image suppressed from causing unevenness can be recorded. The ink jet recording method includes recording an image with an ink jet recording apparatus including: a plurality of aqueous inks; a first ink storage portion; a second ink storage portion; a plurality of tubes; a recording head; and a recovery mechanism. The ratio ($\eta_2/\eta_1$) of the viscosity $\eta_2$ (mPa·s) of the second ink to the viscosity $\eta_1$ (mPa·s) of the first ink is 0.7 or more to 1.5 or less, and the first ink contains a first water-soluble organic solvent having a specific dielectric constant of 40.0 or more.

8 Claims, 4 Drawing Sheets

(51) Int. Cl.
*C09D 11/30* (2014.01)
*C09D 11/40* (2014.01)
*C09D 11/328* (2014.01)
*B41J 2/21* (2006.01)
*B41J 2/14* (2006.01)
*C09D 11/322* (2014.01)
*C09D 11/36* (2014.01)
*C09D 11/38* (2014.01)
*B41J 2/01* (2006.01)

(52) U.S. Cl.
CPC .............. *B41J 2/2103* (2013.01); *C09D 11/30* (2013.01); *C09D 11/322* (2013.01); *C09D 11/328* (2013.01); *C09D 11/36* (2013.01); *C09D 11/38* (2013.01); *C09D 11/40* (2013.01); *B41J 2/01* (2013.01)

(58) Field of Classification Search
CPC ..... C09D 11/322; C09D 11/328; C09D 11/36; C09D 11/38; C09D 11/40
See application file for complete search history.

(56) References Cited

U.S. PATENT DOCUMENTS

| | | | |
|---|---|---|---|
| 7,067,590 B2 | 6/2006 | Sato et al. | |
| 7,151,156 B2 | 12/2006 | Sato et al. | |
| 7,328,991 B2 | 2/2008 | Sato et al. | |
| 7,423,075 B2 | 9/2008 | Ikegami et al. | |
| 7,439,282 B2 | 10/2008 | Sato et al. | |
| 7,442,753 B2 | 10/2008 | Tsubaki et al. | |
| 7,449,513 B2 | 11/2008 | Sato et al. | |
| 7,498,364 B2 | 3/2009 | Sato et al. | |
| 7,528,179 B2 | 5/2009 | Suda et al. | |
| 7,538,147 B2 | 5/2009 | Sato et al. | |
| 7,563,853 B2 | 7/2009 | Tsubaki et al. | |
| 7,572,844 B2 | 8/2009 | Sato et al. | |
| 7,598,332 B2 | 10/2009 | Ikegami et al. | |
| 7,601,790 B2 | 10/2009 | Sato et al. | |
| 7,629,427 B2 | 12/2009 | Sato et al. | |
| 7,704,414 B2 | 4/2010 | Sato et al. | |
| 7,866,806 B2 | 1/2011 | Sato et al. | |
| 8,408,691 B2 | 4/2013 | Koike et al. | |
| 8,450,393 B2 | 5/2013 | Tsubaki et al. | |
| 8,882,255 B2 | 11/2014 | Nakazawa et al. | |
| 8,932,394 B2 | 1/2015 | Kudo et al. | |
| 8,986,435 B2 | 3/2015 | Saito et al. | |
| 8,992,674 B2 | 3/2015 | Ikegami et al. | |
| 9,388,322 B2 | 7/2016 | Kakikawa et al. | |
| 9,453,138 B2 | 9/2016 | Shimizu et al. | |
| 9,574,099 B2 | 2/2017 | Kawabe et al. | |
| 9,809,721 B2 | 11/2017 | Yamamoto et al. | |
| 9,957,399 B2 | 5/2018 | Okazaki et al. | |
| 10,233,343 B2 | 3/2019 | Takebayashi et al. | |
| 10,240,053 B2 | 3/2019 | Nushiro et al. | |
| 10,253,200 B2 | 4/2019 | Kakikawa et al. | |
| 2005/0131102 A1 | 6/2005 | Nakazawa et al. | |
| 2005/0197424 A1 | 9/2005 | Higashi et al. | |
| 2005/0239918 A1 | 10/2005 | Nakazawa et al. | |
| 2006/0009357 A1 | 1/2006 | Fujiwara et al. | |
| 2006/0050117 A1 | 3/2006 | Sato et al. | |
| 2006/0100310 A1 | 5/2006 | Nakazawa et al. | |
| 2006/0160975 A1 | 7/2006 | Suda et al. | |
| 2006/0250463 A1 | 11/2006 | Nakazawa et al. | |
| 2013/0284064 A1 | 10/2013 | Tateishi et al. | |
| 2015/0267065 A1 | 9/2015 | Shimizu et al. | |
| 2016/0355019 A1* | 12/2016 | Negishi | B41J 2/195 |
| 2017/0120592 A1* | 5/2017 | Sakai | B41J 2/14129 |
| 2017/0120619 A1 | 5/2017 | Saito et al. | |
| 2017/0182779 A1* | 6/2017 | Maeda | B41J 2/16523 |
| 2019/0232674 A1 | 8/2019 | Tamanuki et al. | |

FOREIGN PATENT DOCUMENTS

| | | | | |
|---|---|---|---|---|
| JP | 2006-143989 A | | 6/2006 | |
| JP | 2012-149212 A | | 8/2012 | |
| JP | 2015-193792 A | | 11/2015 | |
| JP | 2017-081056 A | | 5/2017 | |
| JP | 2017-081150 A | | 5/2017 | |
| JP | 2017081057 A | * | 5/2017 | .............. B41M 5/00 |
| JP | 2019-130898 A | | 8/2019 | |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus to be used in the method.

Description of the Related Art

In recent years, the number of opportunities for an ink jet recording apparatus to be utilized in an office or a commercial printing field has been increasing. In such field, a large amount of images are recorded and hence high productivity is required. For example, with a view to improving productivity, there has been proposed an ink jet recording apparatus in which an ink storage portion is increased in volume to eliminate the need for the time and effort of replacing an ink cartridge (Japanese Patent Application Laid-Open No. 2017-081150).

In addition, the increase in volume of the ink storage portion has increased the number of sheets on which images can be recorded and hence the number of years for which the ink jet recording apparatus is used has been increasing. Accordingly, there is such a tendency that the securement of the durability of a member for forming the apparatus and the reliability of an ink is strongly required. For example, there has been provided an ink supply tube for an ink jet recording apparatus having flexibility and bending resistance (Japanese Patent Application Laid-Open No. 2003-080724).

Further, with a view to meeting a demand for apparatus miniaturization, there has been known an ink jet recording apparatus including a recovery mechanism for collectively sucking a plurality of inks from a plurality of ejection orifice arrays through the same suction cap. With a view to maintaining high reliability even when the ink jet recording apparatus including such simple recovery mechanism is used, there has been proposed an ink jet recording apparatus in which a difference in evaporation viscosity between the inks of an ink set is specified to improve recoverability (Japanese Patent Application Laid-Open No. 2005-171070).

Incidentally, in recent years, the number of opportunities for a result product printed with an ink jet recording apparatus in, for example, a shop or a photo studio to be sold as a commercial product to a customer has been increasing. The ink jet recording apparatus to be used in such application is required to have such performance as to be capable of recording a photograph or an image with high image quality. To cope with such requirement, there has been proposed an ink jet recording method by which unevenness caused by image recording is reduced (Japanese Patent Application Laid-Open No. 2019-130898).

In addition, there has been proposed an ink jet recording apparatus including a mechanism for collectively sucking a plurality of inks from a plurality of ejection orifice arrays through the same suction cap, in which a ratio between a low-specific dielectric constant solvent and a high-specific dielectric constant solvent to be incorporated into each of the inks, and a relationship between the flow path volumes of nozzles are specified (Japanese Patent Application Laid-Open No. 2017-081056). It is said that according to the ink jet recording apparatus, sticking recoverability can be maintained.

SUMMARY OF THE INVENTION

The inventors of the present invention have investigated a configuration for providing an ink jet recording apparatus that is downsized, and is excellent in durability. As a result, the inventors have found that the adoption of the following three configurations (1) to (3) is suitable:

(1) the lengths of ink supply tubes are not necessarily identical to each other between inks (vary from ink to ink);

(2) a recovery operation of collectively sucking a plurality of inks from a plurality of ejection orifice arrays through the same suction cap is performed; and (3) ink supply tubes each having flexibility are used.

When the respective members of an apparatus are arranged in a compact space, the lengths of a plurality of tubes for connecting a sub tank and a main tank are not necessarily identical to each other between inks and may vary from ink to ink (configuration (1)). In addition, in the case of a system for collectively sucking a plurality of inks from a plurality of ejection orifice arrays through the same suction cap, a recovery mechanism can be made compact (configuration (2)). This is because a distance between the plurality of ejection orifice arrays can be narrowed as compared to a system for sucking inks from a plurality of nozzles through individual suction caps. Further, in normal cases, the sub tank is arranged in the upper portion of a recording head mounted on a carriage or is integrated with the recording head. Accordingly, an ink supply tube one end of which is connected to the main tank and the other end of which is connected to the sub tank is pulled around in the apparatus along with the scanning of the carriage at the time of image recording. Accordingly, to secure durability, an ink supply tube having such flexibility as to be capable of resisting the reciprocal scanning of the carriage is preferably used (configuration (3)). However, in each of Japanese Patent Application Laid-Open No. 2017-081150, Japanese Patent Application Laid-Open No. 2003-080724, Japanese Patent Application Laid-Open No. 2005-171070, Japanese Patent Application Laid-Open No. 2019-130898 and Japanese Patent Application Laid-Open No. 2017-081056, there is no disclosure of an ink jet recording apparatus including all of the configurations (1) to (3).

The inventors of the present invention have recorded an image with the ink jet recording apparatus and the ink set proposed in Japanese Patent Application Laid-Open No. 2005-171070. As a result, the inventors have revealed that even after the apparatus has been filled with an ink and left to stand for a long time period, clogging occurring in an ejection orifice of the apparatus is eliminated by actuating the recovery mechanism thereof and hence the apparatus can be recovered to a state in which the ink is normally ejected, that is, sticking recoverability is satisfactory. However, the inventors have found that in the case of an ink jet recording apparatus adopting the configurations (1) to (3), to normally record an image, suction needs to be repeated many times and hence sticking recoverability may be insufficient. Further, the inventors have newly revealed that unevenness is liable to occur in an image to be obtained immediately after the start of the recording.

Accordingly, an object of the present invention is to solve a problem occurring when an ink jet recording apparatus including the following configurations (1) to (3) is used. That is, the object is to provide an ink jet recording method by which even when the ink jet recording apparatus is used, excellent sticking recoverability is obtained and a high-quality image suppressed from causing unevenness can be recorded. In addition, another object of the present invention is to provide an ink jet recording apparatus to be used in the ink jet recording method.

(1) The lengths of ink supply tubes are not necessarily identical to each other between inks (vary from ink to ink).
(2) A recovery operation of collectively sucking a plurality of inks from a plurality of ejection orifice arrays through the same suction cap is performed.
(3) Ink supply tubes each having flexibility are used.

That is, according to the present invention, there is provided an ink jet recording method for recording an image with an ink jet recording apparatus including: a plurality of aqueous inks each containing a coloring material; a first ink storage portion configured to store each of the plurality of aqueous inks; a second ink storage portion; a plurality of tubes configured to supply the aqueous ink from the first ink storage portion to the second ink storage portion; a recording head including a plurality of nozzles, which are connected to the second ink storage portion and in which each of the plurality of aqueous inks supplied from the second ink storage portion flows, a plurality of ejection orifices configured to eject each of the plurality of aqueous inks in communication to the plurality of nozzles and an ejection orifice surface having arrayed thereon a plurality of ejection orifice arrays including the plurality of ejection orifices and arranged in correspondence with the plurality of aqueous inks; and a recovery mechanism including a suction cap configured to collectively cover the plurality of ejection orifice arrays in abutment with a region including the ejection orifice surface of the recording head and a suction unit configured to collectively suck the aqueous inks in the plurality of nozzles through the suction cap, the plurality of aqueous inks including a first ink and a second ink, the plurality of tubes including a first tube configured to supply the first ink to the second ink storage portion and a second tube configured to supply the second ink to the second ink storage portion, a ratio ($L_1/L_2$) of a length $L_1$ (mm) of the first tube to a length $L_2$ (mm) of the second tube being 1.15 times or more, the first tube and the second tube each having a water vapor permeation amount W (mg/day) at 40° C. of 2 mg/day or more, the recording being performed by applying the aqueous inks ejected from the ejection orifices to a recording medium, wherein a ratio ($\eta_2/\eta_1$) of a viscosity $\eta_2$ (mPa·s) of the second ink to a viscosity $\eta_1$ (mPa·s) of the first ink is 0.7 times or more to 1.5 times or less, and wherein the first ink contains a first water-soluble organic solvent having a specific dielectric constant of 40.0 or more.

According to the present invention, the ink jet recording method, by which even when an ink jet recording apparatus including the following configurations (1) to (3) is used, excellent sticking recoverability is obtained and a high-quality image suppressed from causing unevenness can be recorded, can be provided. In addition, according to the present invention, the ink jet recording apparatus to be used in the ink jet recording method can be provided.

(1) The lengths of ink supply tubes are not necessarily identical to each other between inks (vary from ink to ink).
(2) A recovery operation of collectively sucking a plurality of inks from a plurality of ejection orifice arrays through the same suction cap is performed.
(3) Ink supply tubes each having flexibility are used.

Further features of the present invention will become apparent from the following description of exemplary embodiments with reference to the attached drawings.

DESCRIPTION OF THE EMBODIMENTS

Figure 1:
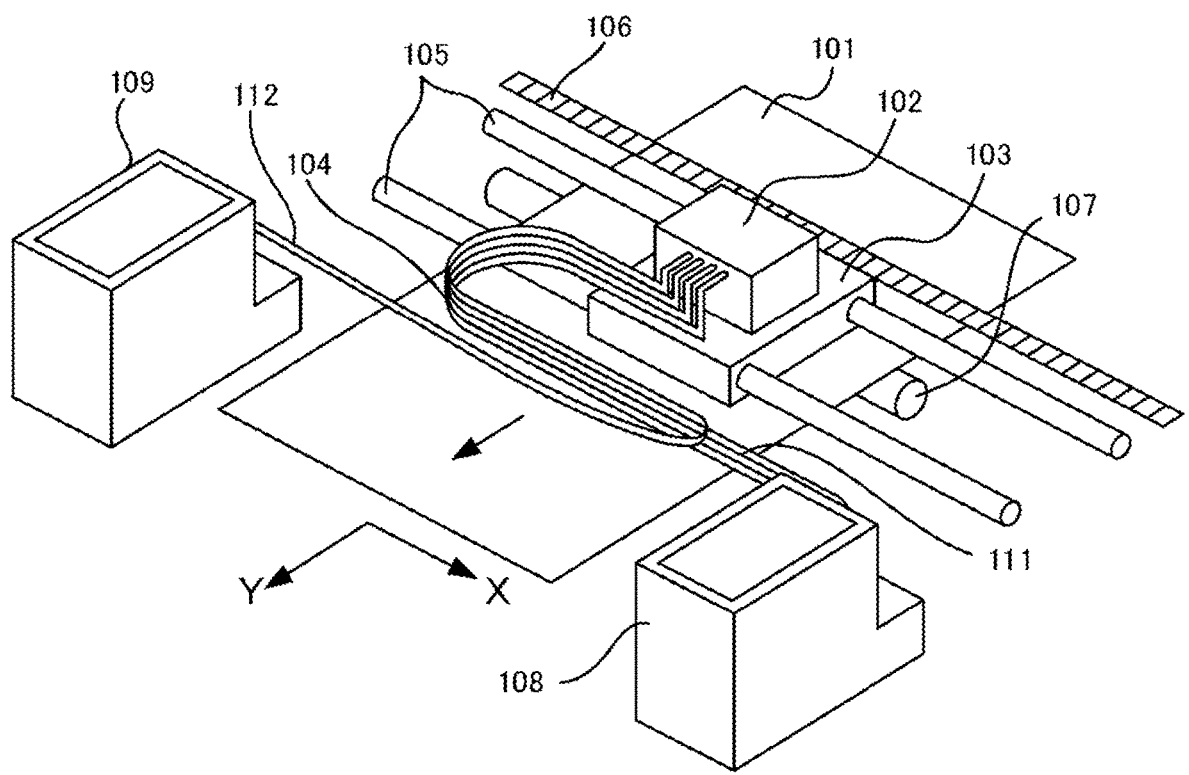
FIG. 1 is a perspective view for schematically illustrating an embodiment of an ink jet recording apparatus of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink for ink jet is sometimes referred to simply as "ink". Physical property values are values at normal temperature (25° C.), unless otherwise stated.

As described above, when the configurations (1) to (3) are adopted in the ink jet recording apparatus proposed in Japanese Patent Application Laid-Open No. 2005-171070, and the apparatus is filled with inks and left to stand for a long time period, sticking recoverability has been insufficient in some cases. In Japanese Patent Application Laid-Open No. 2005-171070, there is a description that with a view to eliminating variation in ink suction amount of a recovery operation to maintain the sticking recoverability, a difference in evaporation viscosity between the inks having different evaporation rates is set within a predetermined range.

However, the inventors have found that when the configurations (1) to (3) for providing an ink jet recording apparatus having a small size and excellent durability are adopted, the variation in suction amount of the recovery operation is caused by a factor different from the difference in viscosity between the inks and hence the sticking recoverability becomes insufficient. When the lengths of the tubes are not necessarily identical to each other between the inks with a view to miniaturizing the apparatus, the surface areas of the tubes, that is, the areas of contact thereof with air are different from each other and hence a difference occurs between the evaporation amounts of the inks. The flexibility of each of the tubes has a correlation with the barrier property of the tube. Specifically, a tube having high flexibility tends to have a large water vapor permeation amount. Accordingly, when a tube having flexibility is adopted with a view to improving the durability, its water vapor permeation amount is large and hence the difference in evaporation amount between the inks becomes significantly larger. As a result, the ink in a long tube having a large evaporation amount may be in a more concentrated state as compared to the ink in a short tube having a small evaporation amount.

In addition, the inks evaporate from the wall surfaces of the tubes and hence the inks present in the vicinities of the inner walls of the tubes are concentrated as compared to the inks present in central portions in the sectional directions of the tubes. Accordingly, in the vicinity of the inner wall of a long tube, the ink is liable to locally have a high viscosity owing to the evaporation of its liquid component and an increase in concentration of its coloring material, and when the ink flows to a recording head, a pressure loss may increase to inhibit the suction of the ink. Meanwhile, in the case of a short tube, the surface area of its wall surface is relatively small and hence the evaporation amount of the ink therein is small. Accordingly, a local increase in viscosity of the ink present in the vicinity of the inner wall of the tube may hardly occur.

Further, the inventors of the present invention have investigated an ink that suppresses a reduction in sticking recoverability even in an ink jet recording apparatus including the above-mentioned configurations (1) to (3). Specifically, an ink supplied by a relatively long tube (first tube) is defined as a "first ink" and an ink supplied by a relatively short tube (second tube) is defined as a "second ink." In addition, the evaporation amount of the first ink was larger than that of the second ink and hence the viscosity of the first ink was adjusted so as to be lower than the viscosity of the second ink. The inventors have revealed that when a relationship between the viscosities of the first ink and the second ink is adjusted as described above, the sticking recoverability is improved to some extent, but there occurs a new problem in that unevenness is liable to occur in an image to be obtained immediately after the start of recording. The unevenness is liable to occur in the image to be obtained immediately after the start of the recording probably because the viscosities of the first ink and the second ink are made different from each other to enlarge a difference in water molar fraction between the inks.

The molar fraction of water in an ink refers to the molar fraction of the water in a water-soluble compound having a molecular weight of 300 or less (including the water) in the ink, and theoretically adopts a value of more than 0% to 100% or less. It is because of the following reason that the compound having a "molecular weight of 300 or less" is adopted as a compound of interest in the calculation of the water molar fraction: a compound having a molecular weight sufficiently large as compared to that of the water has substantially no influence on the water molar fraction when incorporated at a typical content into an aqueous ink for ink jet.

In general, when the vapor pressure of an aqueous solution containing a nonvolatile solute and that of pure water are compared to each other at the same temperature, the former is reduced as compared to the latter and hence the liquid component of the aqueous solution hardly evaporates. In the case of a sufficiently dilute solution or an ideal gas, the extent of a reduction in vapor pressure thereof is proportional to the molar fraction of the solute thereof irrespective of the kind of the solute (Raoult's law). Raoult's law may also be applied to an ink. An aqueous ink for ink jet typically includes, for example, a coloring material or a resin that is treated as a nonvolatile solute at normal temperature (25° C.) and a water-soluble organic solvent having a vapor pressure lower than that of water. Accordingly, the vapor pressure of water in the ink may be calculated in accordance with the following equation (1).

"Vapor pressure of water in ink"="vapor pressure of pure water"×"molar fraction of water in ink" (1)

Next, the equilibrium state of water when an ejection orifice surface having arrayed thereon a plurality of ejection orifice arrays arranged in correspondence with a plurality of aqueous inks is covered with a suction cap and hence a hermetic space is formed in the suction cap is considered. When the molar fraction of water in each of the inks is higher than the relative humidity of the hermetic space in the suction cap, the water in the ink in a nozzle evaporates. In contrast, when the molar fraction of the water in each of the inks is lower than the relative humidity of the hermetic space in the suction cap, water in the suction cap is dissolved in the ink in the nozzle. The evaporation and the dissolution occur until a state represented by the following equation (2) is established. Finally, the equilibrium state is established.

"Relative humidity of hermetic space in suction cap"="molar fraction of water in ink in nozzle" (2)

When the ejection orifice surface having arrayed thereon the plurality of ejection orifice arrays arranged in correspondence with the plurality of aqueous inks is covered with one suction cap, an equilibrium state in which the "relative humidity of the hermetic space in the suction cap" is equal to the "molar fraction of the water in each of the inks" is established. When the inks are different from each other in water molar fraction, water evaporates from the ink having a high water molar fraction and the water is dissolved in the ink having a low water molar fraction. Finally, the water molar fractions of all the inks are equal to the relative humidity of the hermetic space in the suction cap to reach the equilibrium state. That is, the ink having a low water molar fraction absorbs moisture to be diluted and the ink having a high water molar fraction is concentrated by evaporation.

To reduce the viscosity of each of the inks, it is sufficient to increase the water content thereof and to reduce the content of the water-soluble organic solvent thereof. Meanwhile, to increase the viscosity of the ink, it is sufficient to reduce the water content thereof and to increase the content of the water-soluble organic solvent thereof. However, a mere increase or reduction in water content enlarges a difference in water molar fraction between the inks and hence such concentration and dilution of the inks as described above are repeated. The inks present in the vicinities of the ejection orifices in the nozzles of the recording head are brought into concentrated or diluted states as compared to their original states. Accordingly, an image is recorded with the concentrated or diluted inks immediately after the start of the recording. After those inks have been consumed, unevenness occurs in an image to be obtained probably because the image is recorded with the ink that is not diluted or concentrated.

In view of the foregoing, the ratio ($\eta_2/\eta_1$) of the viscosity $\eta_2$ (mPa·s) of the second ink to the viscosity $\eta_1$ (mPa·s) of the first ink is set to 0.7 times or more to 1.5 times or less. When the $\eta_2/\eta_1$ ratio deviates from the range, a difference in viscosity between the first ink and the second ink becomes larger, and a difference in water molar fraction between the first ink and the second ink is also liable to become larger. Accordingly, when a hermetic space is formed by the covering of the plurality of ejection orifice arrays with the same suction cap, the ink having a low water molar fraction is diluted and the ink having a high water molar fraction is concentrated. Accordingly, unevenness is liable to occur in an image immediately after the start of the recording.

As a result of a further investigation, the inventors of the present invention have found that the incorporation of a water-soluble organic solvent having a specific dielectric constant of 40.0 or more (first water-soluble organic solvent) into the first ink supplied by the first tube can achieve both of high levels of sticking recoverability and image quality. Thus, the inventors have reached the present invention. The inventors of the present invention have assumed the reason why the incorporation of the first water-soluble organic solvent having a specific dielectric constant of 40.0 or more into the first ink provides the effect to be as described below.

As described above, the inks in the tubes evaporate from the wall surfaces of the tubes. In normal cases, an aqueous ink for ink jet contains water as a main component and any other component has a vapor pressure lower than that of the water. Of the components of the ink, the water having a high vapor pressure evaporates fast. Accordingly, the ratio of a water-soluble organic solvent in the vicinity of the inner wall of each of the tubes may be higher than that in the central portion of a section of the tube. In addition, the water-soluble organic solvent has higher polarity as its specific dielectric constant becomes higher. A high-specific dielectric constant water-soluble organic solvent having large polarization easily stabilizes the state of presence of a coloring material dissociating into ions in the ink. Accordingly, the solvent may be able to solvate with the concentrated coloring material to suppress the formation of a strong associate or aggregate.

Herein, a case in which the first water-soluble organic solvent is incorporated into the first ink is considered. In this case, along with water evaporation, the ink that has been locally increased in viscosity is present in the vicinity of the inner wall of the tube, but the ratio of the first water-soluble organic solvent therein increases. In that case, the coloring material of the ink concentrated and increased in viscosity in the vicinity of the inner wall of the tube is loosened by the solvating action of the first water-soluble organic solvent on the coloring material, and the coloring material is diffused by the flow of the first ink in the tube. Probably as a result of the foregoing, the viscosity of the first ink present in the vicinity of the inner wall of the tube, which has been a cause for a reduction in suction amount at the time of a recovery operation, reduces to improve the sticking recoverability.

When a recovery mechanism is made compact by collectively sucking a plurality of inks from a plurality of ejection orifice arrays through the same suction cap, it is difficult to set an ink suction amount for each ink. A conventional way of thinking for an improvement in sticking recoverability in an ink jet recording apparatus on which such restriction is imposed is to uniformize the viscosities of the inks to remove variation in suction amount. However, in the case of an ink jet recording apparatus including a plurality of tubes, which have different lengths, are flexible and have large water vapor permeation amounts, a difference in extent of ink evaporation between the tubes is larger than that assumed from a related-art ink jet recording apparatus. Accordingly, when an attempt is made to uniformize the viscosities of the inks from which water has evaporated, a difference in viscosity between the inks from which no water has evaporated is liable to become larger to reduce the quality of an image. That is, it has been impossible to achieve both of sticking recoverability and image quality based on the conventional way of thinking in which the viscosities of the inks are merely adjusted. In contrast, the inventors of the present invention have found that a cause for a reduction in sticking recoverability when a tube having a large water vapor permeation amount is used is an ink increased in viscosity in the vicinity of the inner wall of the tube. In addition, the inventors have found that the incorporation of a water-soluble organic solvent having a predetermined physical property into the ink can improve the sticking recoverability while preventing a reduction in image quality without depending on a mere ink viscosity adjustment.

Ink Jet Recording Method and Ink Jet Recording Apparatus

In an ink jet recording method of the present invention, there is used an ink jet recording apparatus including: a plurality of aqueous inks; a first ink storage portion configured to store each of the plurality of aqueous inks; a second ink storage portion; a plurality of tubes; a recording head; and a recovery mechanism. The plurality of aqueous inks each contain a coloring material. The tubes are each a member (ink supply tube) configured to supply the aqueous ink from the first ink storage portion to the second ink storage portion. The recording head includes a plurality of nozzles, which are connected to the second ink storage portion and in which each of the plurality of aqueous inks supplied from the second ink storage portion flows. Further, the recording head includes: a plurality of ejection orifices configured to eject each of the plurality of aqueous inks in communication to the plurality of nozzles; and an ejection orifice surface having arrayed thereon a plurality of ejection orifice arrays, which are formed of the plurality of ejection orifices and are arranged in correspondence with the plurality of aqueous inks. The recovery mechanism includes: a suction cap configured to collectively cover the plurality of ejection orifice arrays in abutment with a region including the ejection orifice surface of the recording head; and a suction unit configured to collectively suck the aqueous inks in the plurality of nozzles through the suction cap. The plurality of aqueous inks include a first ink and a second ink. The plurality of tubes include a first tube configured to supply the first ink to the second ink storage portion and a second tube configured to supply the second ink to the second ink storage portion. In addition, the ink jet recording method of the present invention includes a step of recording an image by applying the aqueous inks ejected from the ejection orifices of the recording head to a recording medium.

In addition, an ink jet recording apparatus of the present invention includes: a plurality of aqueous inks; a first ink storage portion configured to store each of the plurality of aqueous inks; a second ink storage portion; a plurality of tubes; a recording head; and a recovery mechanism. The plurality of aqueous inks each contain a coloring material. The tubes are each a member (ink supply tube) configured to supply the aqueous ink from the first ink storage portion to the second ink storage portion. The recording head includes a plurality of nozzles, which are connected to the second ink storage portion and in which each of the plurality of aqueous inks supplied from the second ink storage portion flows. Further, the recording head includes: a plurality of ejection orifices configured to eject each of the plurality of aqueous inks in communication to the plurality of nozzles; and an ejection orifice surface having arrayed thereon a plurality of ejection orifice arrays, which are formed of the plurality of ejection orifices and are arranged in correspondence with the plurality of aqueous inks. The recovery mechanism includes: a suction cap configured to collectively cover the plurality of ejection orifice arrays in abutment with a region including the ejection orifice surface of the recording head; and a suction unit configured to collectively suck the aqueous inks in the plurality of nozzles through the suction cap. The plurality of aqueous inks include a first ink and a second ink. The plurality of tubes include a first tube configured to supply the first ink to the second ink storage portion and a second tube configured to supply the second ink to the second ink storage portion.

Ink Jet Recording Apparatus

FIG. 1 is a perspective view for schematically illustrating an embodiment of the ink jet recording apparatus of the present invention. The ink jet recording apparatus of this embodiment is an ink jet recording apparatus of a so-called serial system for performing a recording operation by reciprocally scanning its recording head in an X direction (main scanning direction). A recording medium 101 is intermittently conveyed by a conveying roller 107 to a Y direction (sub-scanning direction). A recording unit 102 mounted on a carriage 103 is reciprocally scanned in the X direction (main scanning direction) that is a direction perpendicular to the Y direction that is the conveying direction of the recording medium 101. The recording operation is performed by the conveyance of the recording medium 101 in the Y direction and the reciprocal scanning of the recording unit 102 in the X direction. The recording unit 102 includes a recording head 203 (FIG. 2) of an ink jet system for ejecting, from a plurality of ejection orifices, an ink to be supplied and a sub tank 202 (FIG. 2) serving as the second ink storage portion, and the unit is mounted on the carriage 103. The carriage 103 is movably supported along guide rails 105 arranged along the X direction, and is fixed to an endless belt 106 moving in parallel to the guide rails 105. The endless belt 106 is reciprocated by the driving force of a motor to reciprocally scan the carriage 103 in the X direction.

A main tank 201 (FIG. 2) serving as the first ink storage portion is stored in each of main tank storage portions 108 and 109. The main tanks 201 of the main tank storage portions 108 and 109, and the sub tanks 202 of the recording unit 102 are connected to each other through ink supply tubes 104 including a tube 111 and a tube 112. The inks are supplied from the main tanks 201 to the sub tanks 202 through the ink supply tubes 104 and are then ejected from the ejection orifices of the recording head 203. The main tanks 201, the ink supply tubes 104, and the sub tanks 202 may each be arranged in a number corresponding to the kinds of the inks.

Figure 2:
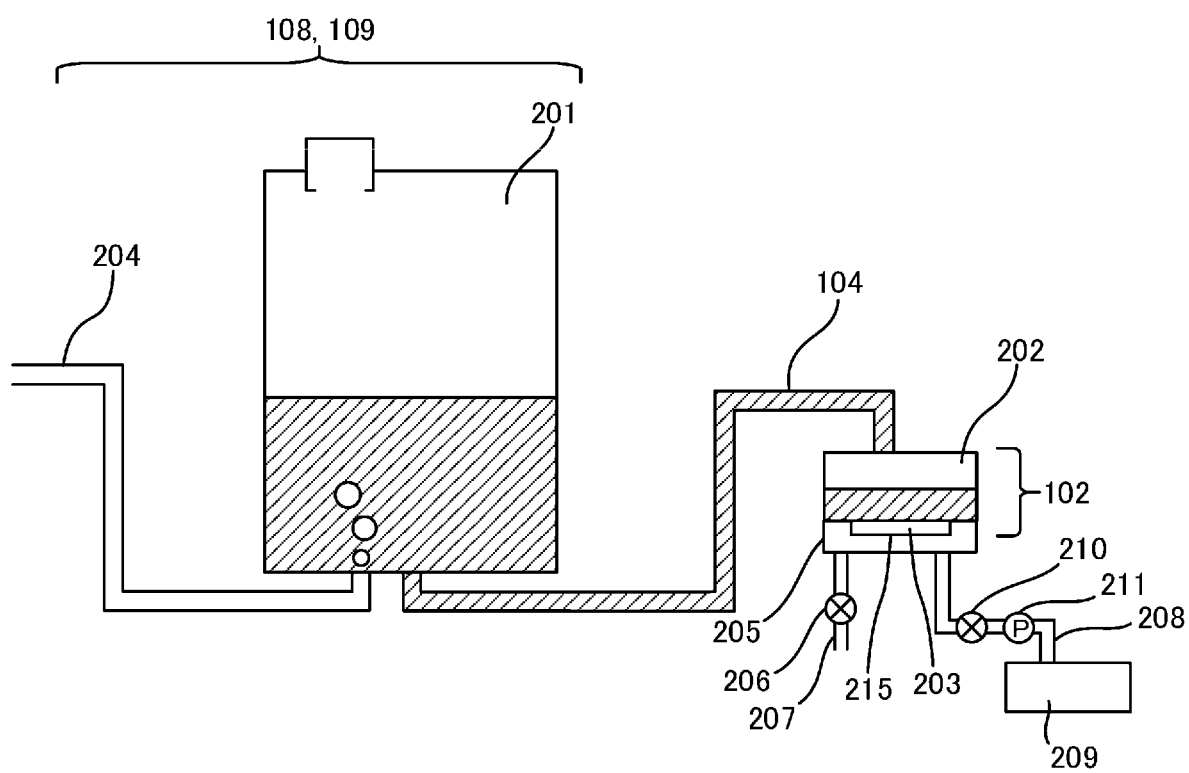
FIG. 2 is a schematic view for illustrating an example of an ink supply system.
Figure 3:
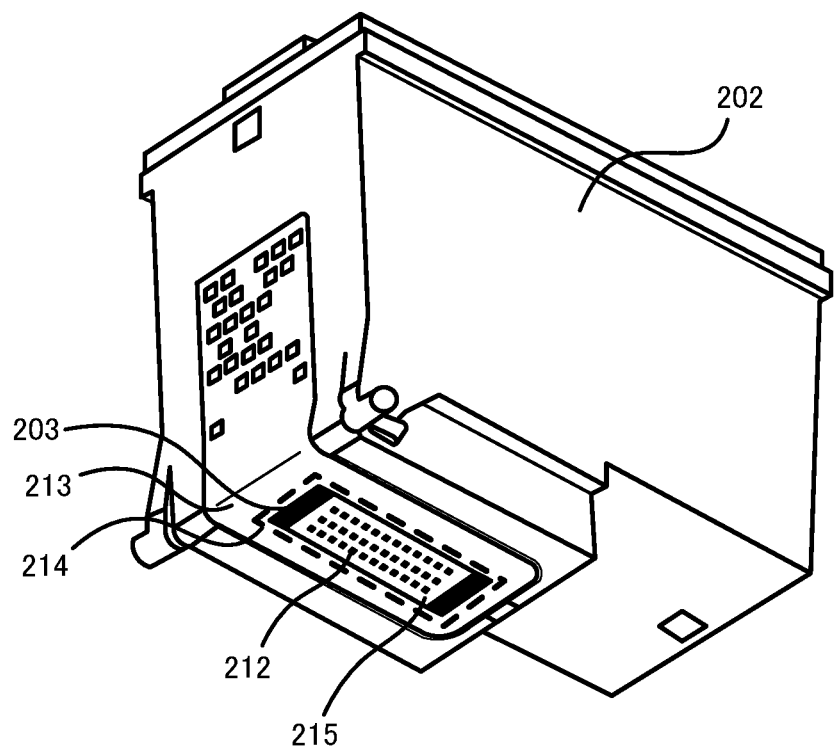
FIG. 3 is a schematic view for illustrating an example of a sub tank.

FIG. 2 is a schematic view for schematically illustrating an example of an ink supply system and FIG. 3 is a schematic view for illustrating an example of the sub tank. The ink (represented by hatching) stored in the main tank 201 is supplied to the sub tank 202 through the ink supply tube 104 and is then supplied to the recording head 203. The recording head 203 includes a plurality of nozzles (not shown), which are connected to the sub tank 202 serving as the second ink storage portion and in which the ink supplied from the sub tank 202 flows. As illustrated in FIG. 3, the recording head 203 further includes an ejection orifice surface 215 having arrayed thereon a plurality of ejection orifice arrays 212 formed of a plurality of ejection orifices configured to eject the ink in communication to the plurality of nozzles.

A gas introduction tube 204 serving as an air communication portion is connected to the main tank 201. When recording is performed to consume the ink, the ink is supplied from the main tank 201 to the sub tank 202 and hence the amount of the ink in the main tank 201 reduces. In that case, air is introduced from the gas introduction tube 204 one end of which is opened to the air into the main tank 201 to keep an internal negative pressure for holding the ink in the ink supply system substantially constant.

The casings of the main tank 201 and the sub tank 202 are formed of thermoplastic resins, such as: polyester; polycarbonate; polyethylene; polypropylene; polystyrene; polyphenylene ether; and mixtures and modified products thereof. An ink absorber capable of generating a negative pressure for holding the ink may be arranged in each of the casings. An absorber obtained by compressing fibers made of, for example, polypropylene or polyurethane is preferred as the ink absorber. In addition, a form in which the ink is directly reserved in the casing without arrangement of the ink absorber may be adopted. To reduce the frequency of tank replacement or to achieve high productivity through an increase in number of sheets on which images can be recorded, the maximum storage amount $V_1$ (mL) of the main tank 201 is preferably increased.

The maximum storage amount $V_1$ (mL) of the main tank 201 is preferably 30 mL or more to 200 mL or less, more preferably 50 mL or more to 150 mL or less. The initial ink loading amount of the main tank 201 is preferably set to up to about 95% with respect to the ink maximum storage amount thereof. The volume $V_2$ (mL) of each of the ink supply tubes 104 is preferably 1 mL or more to 30 mL or less, more preferably 2 mL or more to 20 mL or less.

The recording unit 102 includes the recording head 203 and the sub tank 202. The following form may be adopted: the sub tank 202 is mounted on the recording unit 102, which is a head cartridge having incorporated thereinto the recording head 203, and the recording unit 102 having mounted thereon the sub tank 202 is mounted on the carriage 103. Further, a form in which the recording unit 102 integrally formed by the sub tank 202 and the recording head 203 is mounted on the carriage 103 may be adopted. Of those, a serial system serving as the form in which the recording unit 102 having mounted thereon the sub tank 202 is set on the carriage 103 is preferably adopted.

Examples of the ink ejection system of the recording head 203 may include a system including applying mechanical energy to the ink and a system including applying thermal energy to the ink. Of those, the system including applying the thermal energy to the ink to eject the ink is preferably adopted.

Figure 4A:
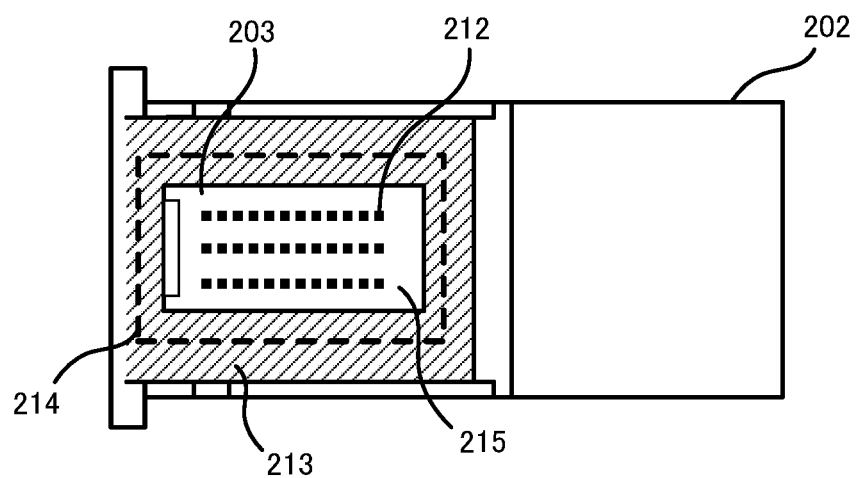
FIG. 4A and FIG. 4B are each a schematic view for illustrating the abutting state of a suction cap.
Figure 4B:
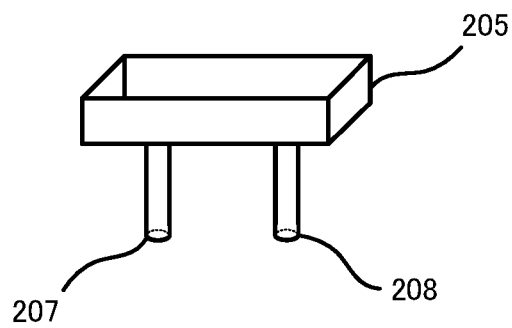

FIG. 4A and FIG. 4B are each a schematic view for illustrating the abutting state of a suction cap. FIG. 4A is an illustration of the bottom surface of the sub tank and FIG. 4B is an illustration of the suction cap. At the time of non-recording, to suppress the evaporation of the ink from the ejection orifices, a suction cap 205 collectively covers the plurality of ejection orifice arrays in abutment with the abutting position 214 of a region including the ejection orifice surface 215 of the recording head 203 in a supporting substrate 213. As illustrated in FIG. 2, a tube 207 serving as an air communication portion having arranged thereon an air communication valve 206 and a waste ink tube 208 for discharging a waste ink that is not used in recording, the waste ink accumulating in the suction cap 205, are connected to the suction cap 205. The waste ink discharged from the plurality of ejection orifices communicating to the plurality of nozzles arranged on the recording head 203 is stored in a waste ink storage portion 209. A suction valve 210 is arranged on the waste ink tube 208 and the ejection state of the recording head can be recovered to a normal state by the suction of the ink in the nozzles through utilization of a pump 211 that is a suction unit. The site at which the ink is sucked, the amount of the ink to be sucked and the like may be appropriately set in accordance with purposes. In any case, the ink is sucked by actuating the pump 211 under a state in which the air communication valve 206 is closed.

Tubes

The plurality of tubes (ink supply tubes) include the first tube configured to supply the first ink to the second ink storage portion and the second tube configured to supply the second ink to the second ink storage portion. The tubes are each increased in flexural rigidity because the tubes are pulled around in the ink jet recording apparatus along with the reciprocal scanning of the carriage. Accordingly, the tubes are each preferably formed of a resin material so that the tubes may each exhibit such flexibility as to be capable of resisting the reciprocal scanning of the recording head. The resin material for forming each of the tubes may be a single resin material, or may be a combination of two or more kinds of resin materials. In addition, a resin material blended with various additives may be used. The structure of each of the tubes may be a single-layer structure or a laminated structure. A thermoplastic elastomer is preferred as the resin material because the elastomer is excellent in moldability, rubber elasticity and flexibility. Examples of the thermoplastic elastomer may include an olefin-based resin, a urethane-based resin, an ester-based resin, a styrene-based resin and a vinyl chloride-based resin. Of those, a styrene-based thermoplastic elastomer is preferred because the elastomer is particularly excellent in flexibility and rubber elasticity. Examples of the additives to be blended into the resin material may include a softening agent, a lubricant, a surfactant, an antioxidant, an age inhibitor, a tackifier and a pigment. The characteristics of the first tube and the second tube may be identical to or different from each other. The first tube and the second tube are particularly preferably tubes made of the same material.

The inner diameter and wall thickness of each of the tubes are appropriately set from the viewpoints of, for example, the productivity of the molding or the like thereof, the flexural rigidity thereof when the tube is pulled around in the recording apparatus, the ink supply property thereof and the gas barrier property thereof. The inner diameter of each of the tubes is preferably 1 mm or more to 5 mm or less, more preferably 1 mm or more to 3 mm or less. In addition, the wall thickness of each of the tubes is preferably 0.5 mm or more to 5 mm or less, more preferably 0.5 mm or more to 3 mm or less, particularly preferably 1 mm or more to 3 mm or less.

The flexibility of each of the tubes has a correlation with the water vapor permeation amount of the tube. That is, a tube having a large water vapor permeation amount tends to be excellent in flexibility. The water vapor permeation amount W (mg/day) of each of the first tube and the second tube at 40° C. is 2 mg/day or more, preferably 3 mg/day or more. When the water vapor permeation amount W is less than 2 mg/day, the flexibility of each of the tubes becomes insufficient and hence it becomes difficult for the tubes to follow the scanning of the carriage. Thus, the durability of the recording apparatus becomes insufficient. The upper limit of the water vapor permeation amount W of each of the tubes is not particularly limited and the water vapor permeation amount only needs to be 10 mg/day or less. When the water vapor permeation amount is excessively high, water evaporation is liable to remarkably progress and hence the inks are liable to be excessively concentrated. However, when the water vapor permeation amount W is 10 mg/day or less, the water-soluble organic solvent having a specific dielectric constant of 40.0 or more can efficiently solvate with the coloring material to suppress the formation of an associate or an aggregate.

The water vapor permeation amount W of each of the tubes may be measured in accordance with the following method. First, a state in which pure water is loaded into the tube cut into a length of 200 mm and both the sides of the tube are sealed with pinch cocks is established. The tube in the state is left to stand under an environment having a temperature of 40° C. and a relative humidity of 20%. A change in mass of the tube is recorded every certain time period and the amount of water vapor that has permeated the tube is measured. Thus, the water vapor permeation amount W (mg/day) may be calculated. The water vapor permeation amount W is a water vapor permeation amount (mg/day) per 200 mm of the length L of the tube. When the tube is formed by connecting two or more kinds of tubes made of different materials, a value obtained by proportionally dividing the water vapor permeation amounts of the respective tubes calculated as described above by their lengths is adopted. For example, the water vapor permeation amount W of a tube formed by connecting a tube having a water vapor permeation amount Wa (mg/day) and a length La (mm), and a tube having a water vapor permeation amount Wb (mg/day) and a length Lb (mm) is calculated as follows:

$$W = (La \times Wa + Lb \times Wb)/(La + Lb).$$

The term "length of a tube" means a length from one end of the tube to the other end thereof, and the length includes the connecting portions of the tube with the main tank and the sub tank. The ratio ($L_1/L_2$) of the length $L_1$ (mm) of the first tube to the length $L_2$ (mm) of the second tube is 1.15 times or more. When the $L_1/L_2$ ratio is set to 1.15 times or more, the ink jet recording apparatus can be miniaturized. The upper limit of the $L_1/L_2$ ratio is not particularly limited and the ratio only needs to be 1.90 times or less. The length L (mm) of each of the tubes is preferably 200 mm or more to 1,200 mm or less, more preferably 300 mm or more to 1,000 mm or less. The length $L_1$ (mm) of the first tube is preferably 400 mm or more to 1,000 mm or less. In addition, the length $L_2$ (mm) of the second tube is preferably 300 mm or more to 800 mm or less.

It is preferred that the first ink be a black ink and the second ink be a color ink. At this time, the ratio (La/Lb) of the length La (mm) of a tube for the black ink to the length Lb (mm) of a tube for the color ink is preferably 1.20 times or more. When the La/Lb ratio is set to 1.20 times or more, the ejection stability of each of the inks can be improved. When the La/Lb ratio is less than 1.20 times, in the case where the respective inks are ejected over a long time period, the ejection stability may slightly reduce. The La/Lb ratio is preferably 2.00 times or less, more preferably 1.90 times or less, particularly preferably 1.50 times or less. When a plurality of color inks are used, the tube for the black ink is preferably longer than any one of the tubes for the color inks.

Recording Step

The ink jet recording method of the present invention includes the step of recording an image with the above-mentioned ink jet recording apparatus (recording step). In the recording step, specifically, the image is recorded by applying the inks ejected from the ejection orifices of the recording head to the recording medium. Any medium may be used as the recording medium on which the image is to be recorded. Of such media, such sheets of paper each having permeability as described below are preferably used: a recording medium free of any coating layer, such as plain paper or uncoated paper; and a recording medium including a coating layer, such as glossy paper or art paper.

An example of a recording system may be a serial system for recording an image while reciprocally scanning the recording head in a main scanning direction perpendicular to the conveying direction of the recording medium (sub-scanning direction). Another example thereof may be a line system for recording an image while conveying the recording medium (paper) with an elongated recording head (line head) corresponding to the width of the recording medium.

Aqueous Ink

The ink jet recording method of the present invention includes the step of recording an image by applying the inks ejected from the ejection orifices of the recording head to the recording medium. The inks are aqueous inks each containing the coloring material, and include the first ink and the second ink.

Coloring Material

A pigment or a dye may be used as the coloring material. The content $C_1$ (% by mass) of the coloring material in the first ink and the content $C_2$ (% by mass) of the coloring material in the second ink are each preferably 0.1% by mass or more to 15.0% by mass or less with respect to the total mass of the ink. In particular, the contents are each more preferably 1.0% by mass or more to 10.0% by mass or less.

When the pigment is used as the coloring material, the dispersion system of the pigment is not particularly limited. For example, a resin-dispersed pigment dispersed with a resin dispersant, a pigment dispersed with a surfactant and a microcapsule pigment obtained by covering at least part of the particle surface of a pigment with a resin or the like may each be used. In addition, for example, a self-dispersible pigment obtained by bonding functional groups including a hydrophilic group, such as an anionic group, to the particle surface of a pigment and a pigment (resin-bonded self-dispersible pigment) obtained by chemically bonding an organic group containing a polymer to the particle surface of a pigment may each be used. In addition, pigments different from each other in dispersion system may be used in combination.

Examples of the pigment may include: inorganic pigments, such as carbon black; and organic pigments, such as azo, phthalocyanine, quinacridone, isoindolinone, imidazolone, diketopyrrolopyrrole and dioxazine. Those pigments may be used alone or in combination thereof.

Examples of the dye may include a direct dye, an acid dye, a basic dye, a dispersed dye and an edible dye. Of those, a dye having an anionic group is preferably used. Specific examples of the skeleton of the dye may include azo, triphenylmethane, phthalocyanine, azaphthalocyanine, xanthene and anthrapyridone. A dye having a C. I. number applied thereto is also preferably used. Examples thereof may include: C. I. Food Black 2; C. I. Direct Black 195; C. I. Direct Yellow: 86, 132 and 173; C. I. Acid Yellow: 17 and 23; C. I. Acid Red: 52, 249 and 289; C. I. Acid Blue 9; and C. I. Direct Blue: 86 and 199.

The dye is preferably used as the coloring material. The dye to be dissolved in an aqueous medium at a molecular level solvates with the medium more easily than the pigment to be incorporated under a dispersed state into the aqueous medium does. Accordingly, the sticking recoverability can be further improved.

The maximum value $N_1$ of the number of ionic groups per molecule of the coloring material (dye) in the first ink and the maximum value $N_2$ of the number of ionic groups per molecule of the coloring material (dye) in the second ink preferably satisfy a relationship of $N_1 \geq N_2$. A coloring material having a large number of ionic groups per molecule thereof easily interacts with the first water-soluble organic solvent having high polarity and hence easily solvates therewith even when concentrated in the vicinity of the inner wall of a tube. Accordingly, when the coloring material in the first ink flowing in the long tube (first tube) in which the ink is more liable to be concentrated has a larger number of the ionic groups, the sticking recoverability can be further improved. The maximum value N of the number of the ionic groups per molecule of the coloring material (dye) in each of the inks is preferably 1 or more to 10 or less, more preferably 2 or more to 8 or less.

Aqueous Medium

The inks are each an aqueous ink containing an aqueous medium that is a mixed liquid of water and a water-soluble organic solvent. Deionized water or ion-exchanged water is preferably used as the water. The content (% by mass) of the water-soluble organic solvent in each of the inks is preferably 3.0% by mass or more to 50.0% by mass or less with respect to the total mass of the ink. The content of the water-soluble organic solvent is a value including the first water-soluble organic solvent and a second water-soluble organic solvent that may be used as required. When the content of the water-soluble organic solvent is excessively small, reliability, such as ejection stability, may slightly reduce. Meanwhile, when the content of the water-soluble organic solvent is excessively large, the viscosity of the ink increases and hence the property by which the ink is supplied may slightly reduce. In addition, the content (% by mass) of the water in each of the inks is preferably 40.0% by mass or more to 95.0% by mass or less with respect to the total mass of the ink.

Any water-soluble organic solvent that may be used for an ink for ink jet, such as an alcohol, a (poly)alkylene glycol, a glycol ether, a nitrogen-containing compound or a sulfur-containing compound, may be used as the water-soluble organic solvent. Specific examples of the water-soluble organic solvent may include: monohydric alcohols each having 1 to 4 carbon atoms, such as methyl alcohol, ethyl alcohol, n-propyl alcohol, isopropyl alcohol (18.3), n-butyl alcohol, sec-butyl alcohol and tert-butyl alcohol; dihydric alcohols, such as 1,2-propanediol (28.8), 1,3-butanediol, 1,5-pentanediol (27.0), 1,2-hexanediol (14.8), 1,6-hexanediol (7.1), 2-methyl-1,3-propanediol and 3-methyl-1,5-pentanediol (23.9); polyhydric alcohols, such as 1,2,6-hexanetriol (28.5), glycerin (42.3), trimethylolpropane (33.7) and trimethylolethane; alkylene glycols, such as ethylene glycol (40.4), diethylene glycol (31.7), triethylene glycol (22.7), tetraethylene glycol, propylene glycol (16.9), butylene glycol, hexylene glycol and thiodiglycol; glycol ethers, such as diethylene glycol monomethyl ether, diethylene glycol monoethyl ether, triethylene glycol monoethyl ether, triethylene glycol monobutyl ether (9.8), tetraethylene glycol monobutyl ether and pentaethylene glycol monobutyl ether; polyalkylene glycols each having a number-average molecular weight of 200 to 1,000, such as polyethylene glycol having a number-average molecular weight of 1,000 (4.6) and polypropylene glycol; nitrogen-containing compounds, such as 2-pyrrolidone (28.0), N-methyl-2-pyrrolidone, 1,3-dimethyl-2-imidazolidinone, N-methylmorpholine, urea (110.3) and ethylene urea (49.7); and sulfur-containing compounds, such as dimethylsulfoxide and bis(2-hydroxyethylsulfone). Numerical values in parentheses applied to the respective water-soluble organic solvents are the specific dielectric constants of the respective water-soluble organic solvents at 25° C. A water-soluble organic solvent having a specific dielectric constant of 3.0 or more to 120.0 or less is preferably used. In addition, a water-soluble organic solvent having a vapor pressure lower than that of water is preferably used.

The specific dielectric constant of the water-soluble organic solvent may be measured using a dielectric constant meter (e.g., product name: "BI-870", manufactured by Brookhaven Instruments Corporation) under the condition of a frequency of 10 kHz. A value calculated from the following equation (3) based on the measurement of the specific dielectric constant of a 50% by mass aqueous solution is adopted as the specific dielectric constant of a water-soluble organic solvent that is solid at 25° C. The "water-soluble organic solvent" generally refers to a liquid, but in the present invention, a solvent that is solid at 25° C. (normal temperature) is also included in the water-soluble organic solvent.

$$\varepsilon_{sol} = 2\varepsilon_{50\%} - \varepsilon_{water} \quad (3)$$

$\varepsilon_{sol}$: Specific dielectric constant of water-soluble organic solvent that is solid at 25° C.

$\varepsilon_{50\%}$: Specific dielectric constant of 50% by mass aqueous solution of water-soluble organic solvent that is solid at 25° C.

$\varepsilon_{water}$: Specific dielectric constant of water

As a water-soluble organic solvent that is generally used for an aqueous ink and is solid at 25° C., there may be given, for example, 1,6-hexanediol, trimethylolpropane, ethylene urea, urea and polyethylene glycol having a number-average molecular weight of 1,000. Herein, the reason why the specific dielectric constant of the water-soluble organic solvent that is solid at 25° C. is determined from the specific dielectric constant of its 50% by mass aqueous solution is as described below. Some of the water-soluble organic solvents that are solid at 25° C. and may serve as a constituent component of an aqueous ink are difficult to prepare into aqueous solutions having high concentrations of more than 50% by mass. Meanwhile, in an aqueous solution having a low concentration of 10% by mass or less, the specific dielectric constant of water is dominant and hence a probable (effective) value of the specific dielectric constant of the water-soluble organic solvent cannot be obtained. In view of the foregoing, the inventors of the present invention have made an investigation. As a result, the inventors have revealed that aqueous solutions serving as measuring objects can be prepared from most solvents that may be used in inks out of the water-soluble organic solvents that are solid at 25° C., and specific dielectric constants determined from the solutions are consistent with the effects of the present invention. For such reason, the inventors have decided to utilize a 50% by mass aqueous solution. In the case of a water-soluble organic solvent, which is solid at 25° C. but has so low a solubility in water that a 50% by mass aqueous solution cannot be prepared therefrom, the value of a specific dielectric constant calculated in conformity with a case in which the $\varepsilon_{sol}$ is determined through utilization of an aqueous solution having a saturated concentration is used for convenience.

First Water-soluble Organic Solvent

The first ink contains the first water-soluble organic solvent having a specific dielectric constant of 40.0 or more. When the specific dielectric constant of the water-soluble organic solvent to be incorporated into the first ink is less than 40.0, the solvent has low polarity and hence has a weak solvating action on the coloring material. Accordingly, a local increase in viscosity of the ink in the vicinity of the inner wall of the tube, which is a cause for a reduction in sticking recoverability, cannot be eliminated.

Further, the second ink also preferably contains the first water-soluble organic solvent having a specific dielectric constant of 40.0 or more. In addition, the content $X_1$ (% by mass) of the first water-soluble organic solvent in the first ink and the content $X_2$ (% by mass) of the first water-soluble organic solvent in the second ink preferably satisfy a relationship of $X_1 > X_2$. When the relationship of $X_1 > X_2$ is satisfied, the ease with which the first ink is sucked from the nozzle connected to the first tube and the ease with which the second ink is sucked from the nozzle connected to the second tube are easily uniformized. Accordingly, the sticking recoverability can be further improved.

Examples of the first water-soluble organic solvent may include ethylene urea (49.7), bis(2-hydroxyethylsulfone) (44.1), glycerin (42.3) and ethylene glycol (40.4). Numerical values in parentheses applied to the respective water-soluble organic solvents are the specific dielectric constants of the respective water-soluble organic solvents at 25° C. The specific dielectric constant of the first water-soluble organic solvent is preferably 120.0 or less and the vapor pressure thereof is preferably lower than that of water. The first water-soluble organic solvent to be incorporated into the first ink and the first water-soluble organic solvent that may be incorporated into the second ink may be identical to or different from each other.

The content (% by mass) of the first water-soluble organic solvent in each of the inks is preferably 1.0% by mass or more to 50.0% by mass or less, more preferably 3.0% by mass or more to 30.0% by mass or less with respect to the total mass of the ink. The content $X_1$ (% by mass) of the first water-soluble organic solvent in the first ink is preferably 1.0% by mass or more to 20.0% by mass or less with respect to the total mass of the ink. In addition, the content $X_2$ (% by mass) of the first water-soluble organic solvent in the second ink is preferably 0.5% by mass or more to 15.0% by mass or less with respect to the total mass of the ink.

Second Water-soluble Organic Solvent

The second ink preferably contains the second water-soluble organic solvent having a specific dielectric constant of 25.0 or less. The second water-soluble organic solvent has hydrophobicity higher than that of a water-soluble organic solvent having a specific dielectric constant of more than 25.0 and hence hardly solvates with the coloring material. Accordingly, the incorporation of the second water-soluble organic solvent into the second ink flowing in the second tube in which a water evaporation amount is small and hence the coloring material is hardly concentrated can provide the following action. That is, the ease with which the first ink is sucked from the nozzle connected to the first tube and the ease with which the second ink is sucked from the nozzle connected to the second tube are easily uniformized. Accordingly, the sticking recoverability can be further improved.

Examples of the second water-soluble organic solvent may include 3-methyl-1,5-pentanediol (23.9), triethylene glycol (22.7), isopropyl alcohol (18.3), propylene glycol (16.9), 1,2-hexanediol (14.8), triethylene glycol monobutyl ether (9.8), tetraethylene glycol monobutyl ether (9.4), 1,6-hexanediol (7.1) and polyethylene glycol having a number-average molecular weight of 1,000 (4.6). Numerical values in parentheses applied to the respective water-soluble organic solvents are the specific dielectric constants of the respective water-soluble organic solvents at 25° C. The specific dielectric constant of the second water-soluble organic solvent is preferably 3.0 or more and the vapor pressure thereof is preferably lower than that of water. The content (% by mass) of the second water-soluble organic solvent in each of the inks is preferably 1.0% by mass or more to 50.0% by mass or less, more preferably 3.0% by mass or more to 30.0% by mass or less with respect to the total mass of the ink. The content $Y_1$ (% by mass) of the second water-soluble organic solvent in the first ink is preferably 0.5% by mass or more to 15.0% by mass or less with respect to the total mass of the ink. In addition, the content $Y_2$ (% by mass) of the second water-soluble organic solvent in the second ink is preferably 1.0% by mass or more to 20.0% by mass or less with respect to the total mass of the ink.

The first ink and the second ink each preferably contain the first water-soluble organic solvent and the second water-soluble organic solvent. In addition, the content of the first water-soluble organic solvent in the first ink is represented by "$X_1$" (% by mass) and the content of the second water-soluble organic solvent in the first ink is represented by "$Y_1$" (% by mass). Further, the content of the first water-soluble organic solvent in the second ink is represented by "$X_2$" (% by mass) and the content of the second water-soluble organic solvent in the second ink is represented by "$Y_2$" (% by mass). In this case, a relationship of $(X_1/Y_1) \geq (X_2/Y_2)$ is preferably satisfied. The ratios $(X_1/Y_1)$ and $(X_2/Y_2)$ are each the ratio of the content of the water-soluble organic solvent having a high affinity for the coloring material to the content of the water-soluble organic solvent having a low affinity for the coloring material. A larger value of each of the ratios means that the ink has a stronger solvating action on the coloring material. That is, when the relationship is satisfied, the first ink in which a liquid component easily evaporates and hence the coloring material is easily concentrated has a solvating action on the coloring material stronger than that of the second ink. Accordingly, the sticking recoverability can be further improved. The first and second water-soluble organic solvents that may be incorporated into the first ink, and the first and second water-soluble organic solvents that may be incorporated into the second ink may be identical to or different from each other.

The content of the first water-soluble organic solvent in the first ink is represented by "$X_1$" (% by mass) and the content of the coloring material in the first ink is represented by "$C_1$" (% by mass). In addition, the content of the first water-soluble organic solvent in the second ink is represented by "$X_2$" (% by mass) and the content of the coloring material in the second ink is represented by "$C_2$" (% by mass). Further, the length of the first tube is represented by "$L_1$" (mm) and the length of the second tube is represented by "$L_2$" (mm). In this case, a relationship of $(X_1/C_1)/(X_2/C_2) \geq (L_1/L_2)$ is preferably satisfied. As the value of the ratio $(L_1/L_2)$ of the length $L_1$ (mm) of the first tube to the length $L_2$ (mm) of the second tube becomes larger, it is assumed that the first ink in the first tube that is relatively long is liable to be concentrated and hence the associated state or aggregated state of the coloring material in the first ink becomes stronger. Accordingly, a larger amount of the first water-soluble organic solvent is preferably incorporated into the first ink for loosening such strong associated state or aggregated state of the coloring material. The values of the ratios ($X_1/C_1$ and $X_2/C_2$) of the contents of the first water-soluble organic solvents in the inks to the contents of the coloring materials are each an indicator of the extent to which the first water-soluble organic solvent solvating with the coloring material is present in the ink. When the "$X_1$", the "$C_1$", the "$X_2$", the "$C_2$", the "$L_1$" and the "$L_2$" do not satisfy the relationship, the content of the first water-soluble organic solvent in the first ink is slightly small and hence an improving effect on the sticking recoverability may not be sufficiently obtained.

Other Components

Various additives, such as a surfactant, an antifoaming agent, a pH adjustor, a viscosity modifier, a rust inhibitor, a preservative agent, a fungicide, an antioxidant and an antireducing agent, may be incorporated into each of the inks as required. None of those additives is included in a "water-soluble organic solvent" serving as an object whose specific dielectric constant is to be calculated.

Physical Properties of Inks

The ratio $(\eta_2/\eta_1)$ of the viscosity $\eta_2$ (mPa·s) of the second ink to the viscosity $\eta_1$ (mPa·s) of the first ink is 0.7 times or more to 1.5 times or less. The viscosity of each of the inks at 25° C. is preferably 1.0 mPa·s or more to 5.0 mPa·s or less, more preferably 1.0 mPa·s or more to 3.5 mPa·s or less. The viscosities of the inks may be measured with a rotary viscometer. In addition, the static surface tension of each of the inks at 25° C. is preferably 28 mN/m or more to 45 mN/m or less. Further, the pH of each of the inks at 25° C. is preferably 5 or more to 9 or less.

EXAMPLES

The present invention is described in more detail below by way of Examples and Comparative Examples. However, the present invention is by no means limited to Examples below without departing from the gist of the present invention. "Part(s)" and "%" with regard to the description of the amounts of components are by mass, unless otherwise stated.

Preparation of Coloring Material (Compound 1)
A sodium salt of a compound represented by the following formula (1) as a free acid form (compound 1) was obtained in conformity with the description of Japanese Patent Application Laid-Open No. 2015-193792.

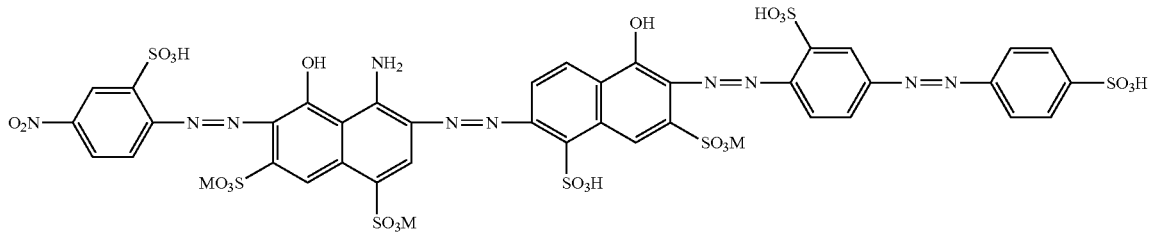
(1)

(Compound 2)

A sodium salt of a compound represented by the following formula (2) as a free acid form (compound 2) was obtained in conformity with the description of Japanese Patent Application Laid-Open No. 2006-143989.

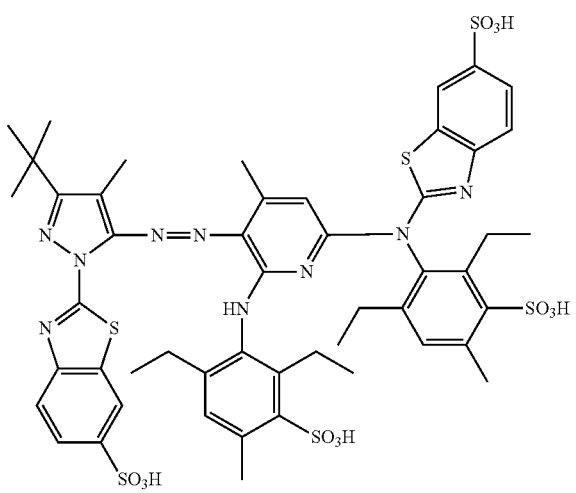
(2)

(Compound 3)

A potassium salt of a compound represented by the following formula (3) as a free acid form (compound 3) was obtained in conformity with the description of Japanese Patent Application Laid-Open No. 2012-149212.

Preparation of Pigment Dispersion Liquid

A pigment dispersion liquid containing a self-dispersible pigment (product name: "Cab-o-jet 300", manufactured by Cabot Corporation) was prepared. The content of the pigment in the pigment dispersion liquid is 15.0%.

Preparation of Ink

Respective components (unit: %) shown in the upper stages of Table 1 and Table 2 were mixed and sufficiently stirred. After that, the mixtures were subjected to pressure filtration through a filter having a pore size of 0.20 μm to prepare respective inks. In addition, when a pigment was used as a coloring material, the mixture was subjected to pressure filtration through a microfilter having a pore size of 3.0 μm to prepare an ink. In Table 1 and Table 2, numerical values in parentheses applied to dyes represent the maximum values of the numbers of ionic groups of the respective dyes and numerical values in parentheses applied to respective water-soluble organic solvents represent the specific dielectric constants of the respective water-soluble organic solvents. In Table 1 and Table 2, the term "Acetylenol E100" represents the product name of a nonionic surfactant manufactured by Kawaken Fine Chemicals Co., Ltd. The viscosities of the inks were measured with a rotary viscometer (product name: "E TYPE VISCOMETER", manufactured by Toki Sangyo Co., Ltd.) at 25° C.

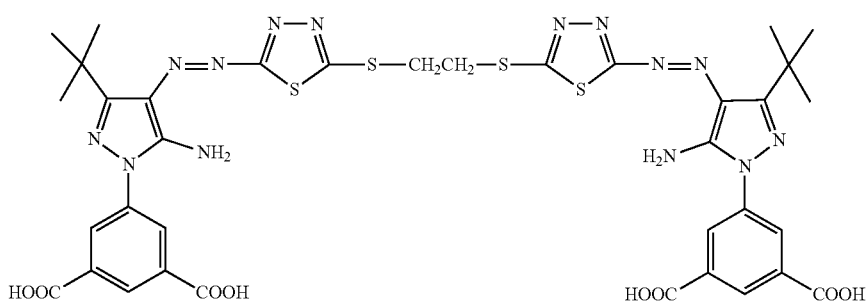
(3)

TABLE 1

Compositions and characteristics of first inks

| | First ink | | | | | | | | | | | | | | | | |
|---|---|---|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 | 1-17 |
| Compound 1 (7) | | 3.0 | | | | | | | | | | | | | | | |
| Compound 2 (4) | 3.0 | | | | | | | 3.0 | 3.0 | 3.0 | 3.0 | 3.0 | 3.0 | 3.0 | 2.0 | 3.0 | 3.0 |
| Compound 3 (4) | | | 3.0 | | | | | | | | | | | | | | |
| C.I. Direct Yellow 132 (3) | | | | 3.0 | | | | | | | | | | | | | |
| C.I. Acid Red 249 (2) | | | | | 3.0 | | | | | | | | | | | | |
| C.I. Acid Blue 9 (2) | | | | | | 3.0 | | | | | | | | | | | |
| C.I. Direct Blue 199 (2) | | | | | | | 3.0 | | | | | | | | | | |
| Pigment dispersion liquid | | | | | | | | | | | | | | | | | |
| Ethylene urea (49.7) | | | | | | | | 15.0 | | | | | | | | | |
| Bis(2-hydroxyethyl)sulfone (44.1) | | | | | | | | | 15.0 | | | | | | | | |
| Glycerin (42.3) | 15.0 | 15.0 | 15.0 | 15.0 | 15.0 | 15.0 | 15.0 | | | | 15.0 | 15.0 | 15.0 | 15.0 | 15.0 | 15.0 | 15.0 |
| Ethylene glycol (40.4) | | | | | | | | | | 15.0 | | | | | | | |
| 1-(2-Hydroxyethyl)-2-pyrrolidone (37.6) | | | | | | | | | | | | | | | | | |
| Trimethylolpropane (33.7) | | | | | | | | | | | | | | | | | |
| Diethylene glycol (31.7) | | | | | | | | | | | | | | | | | |
| 1,4-Butanediol (31.1) | | | | | | | | | | | | | | | | | |
| 1,3-Butanediol (30.0) | | | | | | | | | | | | | | | | | |
| 2-Pyrrolidone (28.0) | | | | | | | | | | | | | | | | | |
| 1,5-Pentanediol (27.0) | | | | | | | | | | | | | | | | | |
| 3-Methyl-1,5-pentanediol (23.9) | 5.0 | 5.0 | 5.0 | 5.0 | 5.0 | 5.0 | 5.0 | 5.0 | 5.0 | 5.0 | | | | | 5.0 | | 15.0 |
| Triethylene glycol (22.7) | | | | | | | | | | | | 5.0 | | | | | |
| Isopropyl alcohol (18.3) | | | | | | | | | | | | | | | | 5.0 | |
| 1,2-Hexanediol (14.8) | | | | | | | | | | | | | 5.0 | | | | |
| Triethylene glycol monobutyl ether (9.8) | | | | | | | | | | | | | | 5.0 | | | |
| 1,6-Hexanediol (7.1) | | | | | | | | | | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Lithium hydroxide | | | | | | | | | | | | | | | | | |
| Lithium acetate | | | | | | | | | | | | | | | | | |
| Ion-exchanged water | 76.5 | 76.5 | 76.5 | 76.5 | 76.5 | 76.5 | 76.5 | 76.5 | 76.5 | 76.5 | 76.5 | 76.5 | 76.5 | 76.5 | 77.5 | 76.5 | 66.5 |
| Viscosity $\eta_1$ of ink (mPa·s) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 3.0 | 3.0 |
| Content $X_1$ of first water-soluble organic solvent (%) | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| Content $Y_1$ of second water-soluble organic solvent (%) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 15.0 |
| Content $C_1$ of coloring material (%) | 3.0 | 3.0 | 3.0 | 3.0 | 3.0 | 3.0 | 3.0 | 3.0 | 3.0 | 3.0 | 3.0 | 3.0 | 3.0 | 3.0 | 1.9 | 3.0 | 3.0 |
| Number $N_1$ of ionic groups of coloring material | 4 | 7 | 4 | 3 | 2 | 2 | 2 | 4 | 4 | 4 | 4 | 4 | 4 | 4 | 4 | 4 | 4 |

| | First ink | | | | | | | | | | | | | | | | |
|---|---|---|---|---|---|---|---|---|---|---|---|---|---|---|---|---|---|
| | 1-18 | 1-19 | 1-20 | 1-21 | 1-22 | 1-23 | 1-24 | 1-25 | 1-26 | 1-27 | 1-28 | 1-29 | 1-30 | 1-31 | 1-32 | 1-33 | 1-34 |
| Compound 1 (7) | | | | | | | | | | | | | | | | | |
| Compound 2 (4) | 1.0 | | 3.0 | 3.0 | 3.0 | 3.0 | 3.0 | 3.0 | 3.0 | 3.0 | 3.0 | 3.0 | 3.0 | 3.0 | 3.0 | 3.0 | |
| Compound 3 (4) | | | | | | | | | | | | | | | | | |
| C.I. Direct Yellow 132 (3) | | | | | | | | | | | | | | | | | 3.0 |
| C.I. Acid Red 249 (2) | | | | | | | | | | | | | | | | | |
| C.I. Acid Blue 9 (2) | | | | | | | | | | | | | | | | | |
| C.I. Direct Blue 199 (2) | | | | | | | | | | | | | | | | | |
| Pigment dispersion liquid | | 3.0 | | | | | | | | | | | | | | | |
| Ethylene urea (49.7) | | | | | | | | | | | | | | | | | |
| Bis(2-hydroxyethyl)sulfone (44.1) | | | | | | | | | | | | | | | | | |
| Glycerin (42.3) | 5.0 | 15.0 | 15.0 | | | | | | | | | | | | | | |
| Ethylene glycol (40.4) | | | | | | | | | | | | | | | | | |
| 1-(2-Hydroxyethyl)-2-pyrrolidone (37.6) | | | | | | | | | | 20.0 | | | | | | | |
| Trimethylolpropane (33.7) | | | 5.0 | | | | | | | | 20.0 | | | | | | 7.5 |
| Diethylene glycol (31.7) | | | | | | | | | | | | 20.0 | | | | | |
| 1,4-Butanediol (31.1) | | | | | | | | | | | | | 20.0 | | | | |
| 1,3-Butanediol (30.0) | | | | | | | | | | | | | | 20.0 | | | |
| 2-Pyrrolidone (28.0) | | | | | | | | | | | | | | | 20.0 | | |
| 1,5-Pentanediol (27.0) | | | | | | | | | | | | | | | | 20.0 | 8.0 |

TABLE 1-continued

Compositions and characteristics of first inks

| | 1-1 | 1-2 | 1-3 | 1-4 | 1-5 | 1-6 | 1-7 | 1-8 | 1-9 | 1-10 | 1-11 | 1-12 | 1-13 | 1-14 | 1-15 | 1-16 | 1-17 |
|---|---|---|---|---|---|---|---|---|---|---|---|---|---|---|---|---|---|
| 3-Methyl-1,5-pentanediol (23.9) | 15.0 | 5.0 | | 20.0 | | | | | | | | | | | | | |
| Triethylene glycol (22.7) | | | 15.0 | | 20.0 | | | | | | | | | | | | 7.5 |
| Isopropyl alcohol (18.3) | | | | | | 20.0 | | | | | | | | | | | 2.5 |
| 1,2-Hexanediol (14.8) | | | | | | | 20.0 | | | | | | | | | | |
| Triethylene glycol monobutyl ether (9.8) | | | | | | | | 20.0 | | | | | | | | | |
| 1,6-Hexanediol (7.1) | | | | | | | | | 20.0 | | | | | | | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 1.0 |
| Lithium hydroxide | | | | | | | | | | | | | | | | | 0.2 |
| Lithium acetate | | | | | | | | | | | | | | | | | 0.2 |
| Ion-exchanged water | 78.5 | 76.5 | 61.5 | 76.5 | 76.5 | 76.5 | 76.5 | 76.5 | 76.5 | 76.5 | 76.5 | 76.5 | 76.5 | 76.5 | 76.5 | 76.5 | 70.1 |
| Viscosity $\eta_1$ of ink (mPa · s) | 1.9 | 2.0 | 4.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Content $X_1$ of first water-soluble organic solvent (%) | 5.0 | 15.0 | 15.0 | 0.0 | 0.0 | 0.0 | 0.0 | 0.0 | 0.0 | 0.0 | 0.0 | 0.0 | 0.0 | 0.0 | 0.0 | 0.0 | 0.0 |
| Content $Y_1$ of second water-soluble organic solvent (%) | 15.0 | 5.0 | 15.0 | 20.0 | 20.0 | 20.0 | 20.0 | 20.0 | 20.0 | 0.0 | 0.0 | 0.0 | 0.0 | 0.0 | 0.0 | 0.0 | 10.0 |
| Content $C_1$ of coloring material (%) | 1.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Number $N_1$ of ionic groups of coloring material | 4 | — | 4 | 4 | 4 | 4 | 4 | 4 | 4 | 4 | 4 | 4 | 4 | 4 | 4 | 4 | 3 |

TABLE 2

Compositions and characteristics of second inks

| | Second ink | | | | | | | | | | | | | | | |
|---|---|---|---|---|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 | 2-16 |
| Compound 1 (7) | | | | | | | | | | | 3.0 | | | | | |
| Compound 2 (4) | | | | | | | | | | | | | | | | |
| Compound 3 (4) | | | | | | | | | | | | 3.0 | | | | |
| C.I. Direct Yellow 132 (3) | | | | | | | | | | | | | | | | |
| C.I. Acid Red 249 (2) | 3.0 | 3.0 | 5.0 | 5.0 | 3.0 | 3.0 | 3.0 | 3.0 | 3.0 | | | | | 3.0 | 2.5 | |
| C.I. Acid Blue 9 (2) | | | | | | | | | | | | | | | | |
| C.I. Direct Blue 199 (2) | | | | | | | | | | | | | | | | 3.5 |
| Pigment dispersion liquid | | | | | | | | | | 3.0 | | | 3.0 | | | |
| Ethylene urea (49.7) | | | | | | | | | | | | | | | | |
| Bis(2-hydroxyethyl)sulfone (44.1) | | | | | | | | | | | | | | | | |
| Glycerin (42.3) | 10.0 | 10.0 | 17.0 | 15.0 | 10.0 | 10.0 | 15.0 | 15.0 | 5.0 | 10.0 | 10.0 | 10.0 | 17.5 | 10.0 | 6.0 | 8.0 |
| Ethylene glycol (40.4) | | | | | | | | | | | | | | | 9.0 | 8.0 |
| 1-(2-Hydroxyethyl)-2-pyrrolidone (37.6) | | | | | | | | | | | | | | | | |
| Trimethylolpropane (33.7) | | | | | | | | | | | | | | | 7.5 | 7.5 |
| Diethylene glycol (31.7) | | | | | | | | | | | | | | | 3.0 | 4.0 |
| 1,4-Butanediol (31.1) | | | | | | | | | | | | | | | | |
| 1,3-Butanediol (30.0) | | | | | | | | | | | | | | | | |
| 2-Pyrrolidone (28.0) | | | | | | | | | | | | | | | | |
| 1,5-Pentanediol (27.0) | | 5.0 | | | | | | | | | | | | 5.0 | | |
| 3-Methyl-1,5-pentanediol (23.9) | 10.0 | 10.0 | 10.0 | 10.0 | | 2.0 | 15.0 | 5.0 | 15.0 | 10.0 | 10.0 | 10.0 | | | | |
| Triethylene glycol (22.7) | | 5.0 | | | | | | | | | | | | 5.0 | | |
| Isopropyl alcohol (18.3) | | | | | | | | | | | | | | | 2.5 | 2.5 |
| 1,2-Hexanediol (14.8) | | | | | | | | | | | | | | | | |
| Triethylene glycol monobutyl ether (9.8) | | | | | | | | | | | | | | | | |
| 1,6-Hexanediol (7.1) | | | | | | | | | | | | | | 20.0 | | |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 1.0 | 0.8 |
| Lithium hydroxide | | | | | | | | | | | | | | | 0.3 | 0.1 |
| Lithium acetate | | | | | | | | | | | | | | | 0.2 | 0.2 |
| Ion-exchanged water | 76.5 | 66.5 | 67.5 | 69.5 | 86.5 | 84.5 | 66.5 | 76.5 | 76.5 | 76.5 | 76.5 | 76.5 | 79.0 | 56.5 | 68.0 | 65.4 |
| Viscosity $\eta_2$ of ink (mPa · s) | 2.0 | 3.0 | 2.9 | 2.7 | 1.5 | 1.7 | 3.0 | 2.0 | 2.0 | 2.0 | 2.0 | 2.0 | 2.6 | 3.1 | 2.5 | 2.5 |
| Content $X_2$ of first water-soluble organic solvent (%) | 10.0 | 10.0 | 17.0 | 15.0 | 10.0 | 10.0 | 15.0 | 15.0 | 5.0 | 10.0 | 10.0 | 10.0 | 17.5 | 10.0 | 15.0 | 16.0 |
| Content $Y_2$ of second water-soluble organic solvent (%) | 10.0 | 15.0 | 10.0 | 10.0 | 0.0 | 2.0 | 15.0 | 5.0 | 15.0 | 10.0 | 10.0 | 10.0 | 0.0 | 25.0 | 2.5 | 2.5 |
| Content $C_2$ of coloring material (%) | 3.0 | 3.0 | 5.0 | 5.0 | 3.0 | 3.0 | 3.0 | 3.0 | 3.0 | 3.0 | 3.0 | 3.0 | 3.0 | 3.0 | 2.5 | 3.5 |
| Number $N_2$ of ionic groups of coloring material | 2 | 2 | 2 | 2 | 2 | 2 | 2 | 2 | 2 | — | 7 | 4 | — | 2 | 2 | 2 |

Production of Tube

Tubes 1 to 11 made of resin compositions each having an inner diameter of 2 mm and an outer diameter of 4 mm were produced by using a styrene-based thermoplastic elastomer, a lubricant and a softening agent. The water vapor permeation amounts (W) of the produced tubes are shown in Table 3. The water vapor permeation amount (W) of each of the tubes is a value per 200 mm of the length L of the tube and is represented in the unit of mg/day.

TABLE 3

Characteristics of tubes

| Tube | Length L (mm) | Water vapor permeation amount W (mg/day) |
|---|---|---|
| 1 | 725 | 5 |
| 2 | 575 | 5 |
| 3 | 1,000 | 5 |
| 4 | 725 | 2 |
| 5 | 725 | 10 |
| 6 | 750 | 5 |
| 7 | 510 | 5 |
| 8 | 725 | 1 |
| 9 | 510 | 1 |
| 10 | 500 | 5 |
| 11 | 500 | 2 |
| 12 | 500 | 10 |
| 13 | 500 | 1 |

Evaluation

An ink jet recording apparatus, which had a main part configuration illustrated in FIG. 1 and had incorporated thereinto an ink supply system having a configuration illustrated in FIG. 2, was prepared. The recording apparatus includes a first ink and a second ink, and a first tube and a second tube whose kinds are shown in Table 4. Respective evaluations were performed with the recording apparatus.

Sticking Recoverability

The respective inks were filled from the main tanks of the ink jet recording apparatus into the sub tanks thereof and the ejection orifices of the recording head thereof through the ink supply tubes thereof. After that, the apparatus was left to stand in an environment having a temperature of 35° C. and a relative humidity of 10% for 3 months. Then, the ejection states of the inks after a recovery operation had been performed a predetermined number of times were recognized and sticking recoverability was evaluated in accordance with the following evaluation criteria. The recovery operation refers to the "cleaning of the print head" of the ink jet recording apparatus. Specifically, the suction cap of the apparatus is brought into abutment with a region including the ejection orifice surface of the recording head, and the first ink and the second ink are collectively sucked from the ejection orifice array of the first ink and the ejection orifice array of the second ink through the suction cap. In the following evaluation criteria, the levels "AA", "A", "A'" and "B" were defined as acceptable levels, while the level "C" was defined as an unacceptable level. Evaluation results are shown in Table 4. Reference Examples 1 to 5 were each indicated by Symbol "AA" because the above-mentioned conditions (1) to (3) were not satisfied and hence a problem in that the sticking recoverability reduced did not occur.

AA: One recovery operation recovered the print head to a state in which all of its ejection orifices were able to normally eject the inks.

A: Two or three recovery operations recovered the print head to a state in which all of its ejection orifices were able to normally eject the inks.

A': Four or five recovery operations recovered the print head to a state in which all of its ejection orifices were able to normally eject the inks.

B: Six to ten recovery operations recovered the print head to a state in which all of its ejection orifices were able to normally eject the inks.

C: Some ejection orifices of the print head were unable to normally eject the inks even after eleven or more recovery operations had been performed.

Image Unevenness

The respective inks were filled from the main tanks of the ink jet recording apparatus into the sub tanks thereof and the ejection orifices of the recording head thereof through the ink supply tubes thereof. Then, a recovery operation (the same operation as that performed in the "Sticking Recoverability" evaluation) was performed. After that, the apparatus was left to stand in an environment having a temperature of 30° C. and a relative humidity of 10% for 120 hours under a state in which the recording head was capped. After that, a solid image of a secondary color having a recording duty of 50% was recorded on A4 size plain paper (product name: "HIGH-QUALITY EXCLUSIVE PAPER HR-101S", manufactured by Canon Inc.). The recording duty of each of the first ink and the second ink was set to 25%. In Examples, the recording duty of a solid image recorded under such a condition that two ink droplets having a mass per droplet of 5 ng are applied to a unit region measuring 1/600 inch by 1/600 inch is defined as 100%. Then, image unevenness was evaluated in accordance with the following evaluation criteria. In the following evaluation criteria, the level "A" was defined as an acceptable level and the level "C" was defined as an unacceptable level. Evaluation results are shown in Table 4.

A: When images at a writing start position and a writing end position were visually compared to each other, there was no difference between both the images.

C: When the images at the writing start position and the writing end position were visually compared to each other, unevenness was able to be observed.

TABLE 4

Evaluation conditions and evaluation results

| | | Ink | | Tube | | Evaluation result | |
|---|---|---|---|---|---|---|---|
| | | First | Second | First | Second | Sticking recoverability | Image unevenness |
| Example | 1 | 1-1 | 2-1 | 1 | 10 | AA | A |
| | 2 | 1-2 | 2-1 | 1 | 10 | AA | A |

TABLE 4-continued

Evaluation conditions and evaluation results

|  |  | Ink | | Tube | | Evaluation result | |
|---|---|---|---|---|---|---|---|
|  |  | First | Second | First | Second | Sticking recoverability | Image unevenness |
|  | 3 | 1-3 | 2-1 | 1 | 10 | AA | A |
|  | 4 | 1-4 | 2-1 | 1 | 10 | AA | A |
|  | 5 | 1-5 | 2-1 | 1 | 10 | AA | A |
|  | 6 | 1-6 | 2-1 | 1 | 10 | AA | A |
|  | 7 | 1-7 | 2-1 | 1 | 10 | AA | A |
|  | 8 | 1-8 | 2-1 | 1 | 10 | AA | A |
|  | 9 | 1-9 | 2-1 | 1 | 10 | AA | A |
|  | 10 | 1-10 | 2-1 | 1 | 10 | AA | A |
|  | 11 | 1-11 | 2-1 | 1 | 10 | AA | A |
|  | 12 | 1-12 | 2-1 | 1 | 10 | AA | A |
|  | 13 | 1-13 | 2-1 | 1 | 10 | AA | A |
|  | 14 | 1-14 | 2-1 | 1 | 10 | AA | A |
|  | 15 | 1-1 | 2-1 | 2 | 10 | AA | A |
|  | 16 | 1-15 | 2-1 | 3 | 10 | AA | A |
|  | 17 | 1-1 | 2-1 | 4 | 11 | AA | A |
|  | 18 | 1-1 | 2-1 | 5 | 12 | AA | A |
|  | 19 | 1-1 | 2-2 | 1 | 10 | AA | A |
|  | 20 | 1-16 | 2-1 | 1 | 10 | AA | A |
|  | 21 | 1-1 | 2-3 | 1 | 10 | A | A |
|  | 22 | 1-1 | 2-4 | 1 | 10 | AA | A |
|  | 23 | 1-1 | 2-1 | 3 | 10 | A' | A |
|  | 24 | 1-1 | 2-1 | 6 | 10 | AA | A |
|  | 25 | 1-1 | 2-5 | 1 | 10 | A' | A |
|  | 26 | 1-1 | 2-6 | 1 | 10 | A | A |
|  | 27 | 1-17 | 2-7 | 1 | 10 | AA | A |
|  | 28 | 1-1 | 2-8 | 1 | 10 | AA | A |
| Example | 29 | 1-18 | 2-9 | 1 | 10 | AA | A |
|  | 30 | 1-19 | 2-10 | 1 | 10 | A' | A |
|  | 31 | 1-1 | 2-11 | 1 | 10 | A | A |
|  | 32 | 1-1 | 2-12 | 1 | 10 | AA | A |
|  | 33 | 1-19 | 2-13 | 1 | 10 | B | A |
| Comparative | 1 | 1-1 | 2-14 | 1 | 10 | C | A |
| Example | 2 | 1-20 | 2-1 | 1 | 10 | C | A |
|  | 3 | 1-21 | 2-1 | 1 | 10 | C | A |
|  | 4 | 1-22 | 2-1 | 1 | 10 | C | A |
|  | 5 | 1-23 | 2-1 | 1 | 10 | C | A |
|  | 6 | 1-24 | 2-1 | 1 | 10 | C | A |
|  | 7 | 1-25 | 2-1 | 1 | 10 | C | A |
|  | 8 | 1-26 | 2-1 | 1 | 10 | C | A |
|  | 9 | 1-27 | 2-1 | 1 | 10 | C | A |
|  | 10 | 1-28 | 2-1 | 1 | 10 | C | A |
|  | 11 | 1-29 | 2-1 | 1 | 10 | C | A |
|  | 12 | 1-30 | 2-1 | 1 | 10 | C | A |
|  | 13 | 1-31 | 2-1 | 1 | 10 | C | A |
|  | 14 | 1-32 | 2-1 | 1 | 10 | C | A |
|  | 15 | 1-33 | 2-1 | 1 | 10 | C | A |
|  | 16 | 1-34 | 2-15 | 1 | 10 | C | A |
|  | 17 | 1-34 | 2-16 | 1 | 10 | C | A |
| Reference | 1 | 1-1 | 2-1 | 7 | 10 | AA | A |
| Example | 2 | 1-1 | 2-1 | 8 | 13 | AA | A |
|  | 3 | 1-1 | 2-1 | 9 | 13 | AA | A |
|  | 4 | 1-1 | 2-14 | 9 | 13 | AA | A |
|  | 5 | 1-21 | 2-1 | 9 | 13 | AA | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-205179, filed Dec. 10, 2020 and Japanese Patent Application No. 2021-176578, filed Oct. 28, 2021, which are hereby incorporated by reference herein in their entirety.

What is claimed is:

1. An ink jet recording method for recording an image with an ink jet recording apparatus comprising:
   a plurality of aqueous inks each containing a coloring material;
   a first ink storage portion configured to store each of the plurality of aqueous inks;
   a second ink storage portion;
   a plurality of tubes configured to supply the aqueous ink from the first ink storage portion to the second ink storage portion;

a recording head including a plurality of nozzles, which are connected to the second ink storage portion and in which each of the plurality of aqueous inks supplied from the second ink storage portion flows, a plurality of ejection orifices configured to eject each of the plurality of aqueous inks in communication to the plurality of nozzles and an ejection orifice surface having arrayed thereon a plurality of ejection orifice arrays including the plurality of ejection orifices and arranged in correspondence with the plurality of aqueous inks; and a recovery mechanism including a suction cap configured to collectively cover the plurality of ejection orifice arrays in abutment with a region including the ejection orifice surface of the recording head and a suction unit configured to collectively suck the aqueous inks in the plurality of nozzles through the suction cap, the plurality of aqueous inks including a first ink and a second ink, the plurality of tubes including a first tube configured to supply the first ink to the second ink storage portion and a second tube configured to supply the second ink to the second ink storage portion, a ratio ($L_1/L_2$) of a length $L_1$ (mm) of the first tube to a length $L_2$ (mm) of the second tube being 1.15 times or more, the first tube and the second tube each having a water vapor permeation amount W (mg/day) at 40° C. of 2 mg/day or more, the recording being performed by applying the aqueous inks ejected from the ejection orifices to a recording medium, wherein a ratio ($\eta_2/\eta_1$) of a viscosity $\eta_2$ (mPa·s) of the second ink to a viscosity $\eta_1$ (mPa·s) of the first ink is 0.7 times or more to 1.5 times or less, and wherein the first ink contains a first water-soluble organic solvent having a specific dielectric constant of 40.0 or more.

2. The ink jet recording method according to claim 1, wherein the second ink comprises the first water-soluble organic solvent having a specific dielectric constant of 40.0 or more, and wherein a content $X_1$ (% by mass) of the first water-soluble organic solvent in the first ink and a content $X_2$ (% by mass) of the first water-soluble organic solvent in the second ink satisfy a relationship of $X_1 > X_2$.

3. The ink jet recording method according to claim 2, wherein the content $X_1$ (% by mass) of the first water-soluble organic solvent in the first ink, a content $C_1$ (% by mass) of the coloring material in the first ink, the content $X_2$ (% by mass) of the first water-soluble organic solvent in the second ink, a content $C_2$ (% by mass) of the coloring material in the second ink, the length $L_1$ (mm) of the first tube and the length $L_2$ (mm) of the second tube satisfy a relationship of $(X_1/C_1)/(X_2/C_2) \geq (L_1/L_2)$.

4. The ink jet recording method according to claim 1, wherein the second ink contains a second water-soluble organic solvent having a specific dielectric constant of 25.0 or less.

5. The ink jet recording method according to claim 4, wherein the first ink and the second ink each contain the first water-soluble organic solvent and the second water-soluble organic solvent, and wherein the content $X_1$ (% by mass) of the first water-soluble organic solvent in the first ink, a content $Y_1$ (% by mass) of the second water-soluble organic solvent in the first ink, the content $X_2$ (% by mass) of the first water-soluble organic solvent in the second ink and a content $Y_2$ (% by mass) of the second water-soluble organic solvent in the second ink satisfy a relationship of $(X_1/Y_1) \geq (X_2/Y_2)$.

6. The ink jet recording method according to claim 1, wherein the coloring material is a dye.

7. The ink jet recording method according to claim 6, wherein a maximum value $N_1$ of the number of ionic groups per molecule of the coloring material in the first ink and a maximum value $N_2$ of the number of ionic groups per molecule of the coloring material in the second ink satisfy a relationship of $N_1 \geq N_2$.

8. An ink jet recording apparatus comprising:
a plurality of aqueous inks each containing a coloring material;
a first ink storage portion configured to store each of the plurality of aqueous inks;
a second ink storage portion;
a plurality of tubes configured to supply the aqueous ink from the first ink storage portion to the second ink storage portion;
a recording head including a plurality of nozzles, which are connected to the second ink storage portion and in which each of the plurality of aqueous inks supplied from the second ink storage portion flows, a plurality of ejection orifices configured to eject each of the plurality of aqueous inks in communication to the plurality of nozzles and an ejection orifice surface having arrayed thereon a plurality of ejection orifice arrays including the plurality of ejection orifices and arranged in correspondence with the plurality of aqueous inks; and
a recovery mechanism including
a suction cap configured to collectively cover the plurality of ejection orifice arrays in abutment with a region including the ejection orifice surface of the recording head and
a suction unit configured to collectively suck the aqueous inks in the plurality of nozzles through the suction cap, the plurality of aqueous inks including a first ink and a second ink, the plurality of tubes including a first tube configured to supply the first ink to the second ink storage portion and a second tube configured to supply the second ink to the second ink storage portion, a ratio ($L_1/L_2$) of a length $L_1$ (mm) of the first tube to a length $L_2$ (mm) of the second tube being 1.15 times or more, the first tube and the second tube each having a water vapor permeation amount W (mg/day) at 40° C. of 2 mg/day or more, wherein a ratio ($\eta_2/\eta_1$) of a viscosity $\eta_2$ (mPa·s) of the second ink to a viscosity $\eta_1$ (mPa·s) of the first ink is 0.7 times or more to 1.5 times or less, and wherein the first ink contains a first water-soluble organic solvent having a specific dielectric constant of 40.0 or more.

* * * * *